Feb. 18, 1958  B. LONG  2,823,491
PRODUCTION OF BIREFRINGENT GLASS
Filed May 3, 1955  4 Sheets-Sheet 1
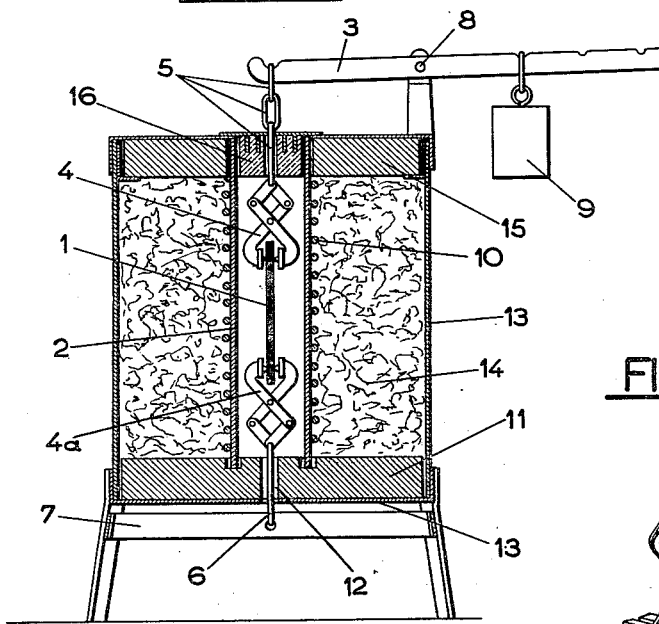
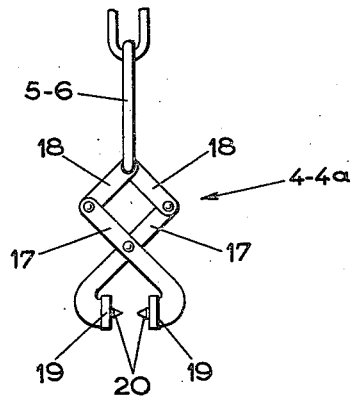
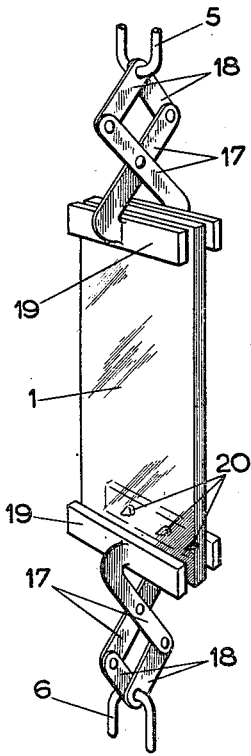
INVENTOR:
BERNARD LONG

INVENTOR:
BERNARD LONG

Feb. 18, 1958  B. LONG  2,823,491
PRODUCTION OF BIREFRINGENT GLASS
Filed May 3, 1955  4 Sheets—Sheet 4

INVENTOR:
BERNARD LONG

United States Patent Office 2,823,491
Patented Feb. 18, 1958

2,823,491

PRODUCTION OF BIREFRINGENT GLASS

Bernard Long, Paris, France, assignor to Compagnies Reunies des Glaces & Verres Speciaux du Nord de la France, Paris, France, a corporation of France Application May 3, 1955, Serial No. 505,768

Claims priority, application France October 18, 1950

9 Claims. (Cl. 49—89)

The present invention relates to a method of imparting permanent birefringent properties to glass. The treated glass may be subsequently cut or worked without losing its birefringent properties and without splintering or fragmentation. This application is a continuation-in-part of my previous application Serial No. 251,714, filed October 17, 1951, now abandoned.

Birefringence, i. e., double-refraction, is the ability of a substance to resolve a beam of incident light into two polarized refracted beams. Consequently, a birefringent lens will produce two distinct images.

Glass, normally, is not birefringent. By introducing internal stresses into the glass, however, it may be made birefringent. Such internal stresses may be introduced in either of the two following ways:

(1) Mechanically, by application of external forces producing an elastic deformation of the glass;

(2) Thermally or by tempering, by solidifying molten glass rapidly thereby producing a temperature gradient in the glass during its solidification.

The first of these methods is deficient in that the birefringence is temporary and disappears upon suppression of the external forces.

In the second case, although the birefringence is permanent, the temperature gradient during solidification serves to place the surfaces of the glass under compression while the interior of the glass is under tension. Moreover, the magnitude of the forces of compression and tension and the birefringence resulting therefrom vary throughout the glass. In attempting to cut such a glass, the equilibrium between the forces of tension and compression is upset and the glass, in self-adjustment to a new equilibrium state, undergoes splintering and fragmentation.

It is accordingly an object of the present invention to provide a procedure whereby glass may be treated to impart thereto permanent properties of birefringence.

According to modern theories on the structure of glass, one can consider glass as essentially composed of (1) a skeleton or honeycomb-like framework which is responsible for the shape of the material, and (2) a filler which is located within the cells and cavities of the skeleton. At ordinary temperatures both of these components, i. e., filler and skeleton, are rigid and immobile. As the temperature is raised the filler loses its rigidity and moves about within the cavities. The skeleton, however, is substantially rigid. Consequently, the glass though softened is not liquified and does not exhibit a sharp melting point. On cooling, the original shape can be restored. At higher temperatures a true melting will take place when the skeleton also loses its rigidity, and the original shape cannot be restored even upon subsequent cooling.

It has now been found that the glass may be made birefringent in a different manner, i. e., by introducing permanent internal stresses between the skeleton and the filling material. Furthermore, by avoiding introduction of internal stresses due to temperature gradients the resulting glass may be cut without splintering.

This is accomplished by heating the glass until it softens, i. e., until the filling material becomes mobile, before the skeleton loses its rigidity. At this point where the glass, though softened, has not undergone any substantial deformation, an external force of tension or compression is applied to the glass to deform the skeleton elastically. By maintaining this force during cooling until the filler has become immobile, i. e., until final solidification, the requisite internal stresses between the filler and skeleton caused by the elastic deformation of the skeleton are "frozen" into the glass and the desired permanent birefringence results.

Internal thermal gradients are avoided by effecting the cooling slowly so as to inhibit the retention in the glass of the permanent internal stresses which result from such gradients; or if the glass is cooled rapidly, by thereafter annealing it. For convenience, glass produced by either method is hereinafter referred to as "annealed glass" since permanent internal stresses have been avoided in both cases. When annealed, the glass is, of course heated to a temperature lower than that employed for the initial heating. The lower annealing temperature serves to remove birefringences due to the thermal gradient but because the temperature is lower than the initial heating, the annealing does not affect the skeletal deformation and thus does not affect the novel birefringence produced in accordance with the present invention.

Annealing is generally recognized as the heating of glass to an elevated temperature at which the glass is not yet softened or capable of deformation. The particular value for annealing will depend upon the composition of the glass being subjected to treatment and can be determined either by simple experiment or by reference to handbooks.

The initial heating of the glass, whether in sheet, rod or other form, is effected at a temperature above the annealing range wherein the filling material becomes mobile. Because the skeleton has not lost its rigidity, however, the glass has not been deformed to any substantial extent. The temperatures for this heating will also vary in dependence upon the composition of the glass and will generally lie about 100° C. above the annealing range.

The heating may also be defined in terms of the viscosity of the glass. Specifically, the glass is brought to a temperature at which the viscosity lies between $10^{10}$ and $10^{13}$ poises, and preferably about $10^{11}$, this value corresponding to a temperature within the softening range wherein the glass is not appreciably deformed, i. e., where the skeleton is elastically deformable. Upon cooling the viscosity will be increased above $10^{13}$ poises and the skeleton will thus be "frozen." During annealing, when practiced, the temperature is maintained sufficiently low that the viscosity will still exceed $10^{13}$ poises.

If the initial heating is continued to a temperature at which substantial deformation takes place, i. e., a viscosity below $10^{10}$ poises, the special birefringence will assume a very high value. Specifically, a deformation or elongation of the order of 10% is too great and, moreover, unduly large birefringences have no known uses. Accordingly, elongation should be limited to a maximum of 10% and preferably the elongation should be only 2–3% or lower.

The composition of the glass is also material with respect to introduction of the desired birefringent properties. Borosilicate glasses generally exhibit the requisite phenomena following treatment, the birefringence depending upon the $B_2O_3$ content as well as upon the quantities of the other oxides present in the glass. Appreciable amounts of alumina or very high quantities of silica reduce and may even eliminate the possibility of birefringence. On the other hand, alkaline earth metal oxides such as CaO and BaO enhance and supplement the effects of $B_2O_3$ so that the birefringence is increased to a higher value than in the absence of said oxides.

In general, therefore, the glass to be treated should contain by weight from 50–75% of silica, from 5–25% of $B_2O_3$, and less than 5% of $Al_2O_3$. Varying amounts of oxides of other metals such as the alkali and alkaline earth metals, lead, zinc, and other metals normally associated with silica may also be present.

In the treatment of sheets or plates of glass, there is preferably employed an apparatus such as that shown in the accompanying drawings, wherein:

Fig. 1 is a vertical cross-section, taken along a plane perpendicular to the longitudinal axis of the sheet, of a first embodiment for putting into practice the process of the invention;

Fig. 2 is a detail view of the tensioning tongs of Fig. 1 on an enlarged scale;

Fig. 3 is a perspective view of the glass sheet of Fig. 1 with the ends thereof secured between the tensioning tongs;

Figure 4:
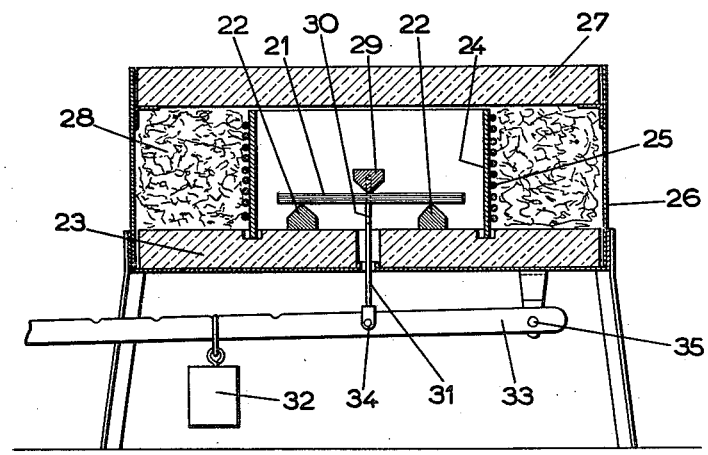
Fig. 4 is a vertical cross-section of a second embodiment of suitable apparatus, taken along a plane perpendicular to the longitudinal axis of the sheet.

In the embodiment shown in Fig. 1, the glass sheet 1 is vertically heated within the enclosure 2 made of refractory material, the sheet being simultaneously subjected to a vertical tensioning force by means of a lever 3 exerting its action upon the sheet 1 through the intermediary of the hinged tongs 4 and 4a, and by means of upper link 5 and lower link 6 passing through a hole provided in the transverse member 7 at the bottom of the oven, such hole constituting a stationary point for the device.

The lever 3, at one end of which the upper tongs 4 are hooked by the link 5, is movable about a horizontal axle 8. The tension applied to the sheet 1 may be varied by displacing the weight 9 along the longer arm of said lever 3.

The heating of the enclosure 2 is effected by the electrical resistance 10 wound around the external surface thereof, said enclosure 2 being disposed upon a heat insulating refractory slab having a hole 12 for the passage of links 6. Said slab 11 bears upon the horizontal bottom of the sheet casing 13.

Laterally, the heat insulation of the enclosure 2 is obtained by means of a heat-insulating material 14 such as kieselguhr, asbestos packing, or the like.

At its upper portion, said sheet casing 13 is closed by a heat-insulating refractory slab 15, laid upon angles. The enclosure 2 is closed by a sort of stopper 16 constituted by a slab made of a heat-insulating refractory material and carrying a reinforcing part which bears upon said slab 15.

The hinged tongs 4 (or 4a) shown in detail in Fig. 2, which are of a type conventionally used for vertically suspending the glass sheets to be tempered, comprise two long arms 17 and two short arms 18; these arms have a flat shape and are preferably made of stainless steel. Three hinges of said tongs have their respective axles perpendicular to the plane of the figure, the link 5 (or 6) providing for the fourth axle, On the free end of the two long arms 17 are welded small plates 19 perpendicular to the plane of the figure which are provided with several projecting portions 20 made of very hard metal and between which the faces of the sheet 1 may be inserted.

When a tension is applied to the tongs, the points 20 catch the glass surface and distribute the tensioning stress over the width of the sheet.

Fig. 3 completes the description of this first embodiment by showing the manner in which the tensioning force is applied through the intermediary of the tongs.

Figure 5:
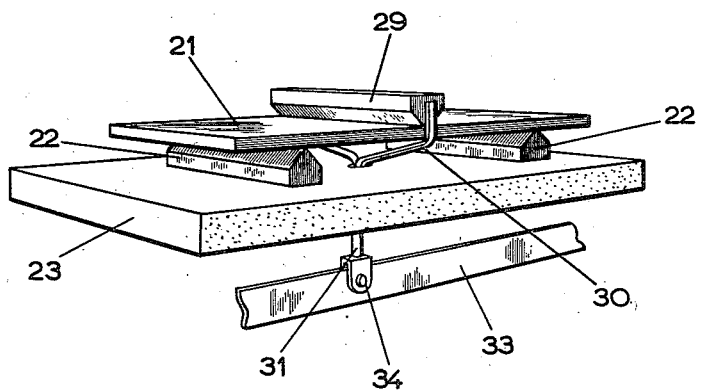
Fig. 5 shows in perspective view on an enlarged scale the details of the sheet treated in Fig. 4 together with the associated supports and load-applying means.

In the modified form shown in Figs. 4 and 5, the sheet 21 horizontally bears upon two supports 22 made of stainless steel which are laid upon a heat-insulating refractory slab 23. The sheet 21 is surrounded by a refractory enclosure 24 around which is wound a heating resistance 25. The oven is completed by a sheet casing 26 closed at its upper portion by a heat-insulating refractory slab 27 which bears on angles.

Laterally, the heat-insulation is provided for by the heat-insulating material 28 which may be kieselguhr, asbestos packing, or the like.

Through the intermediary of the knife edge of a fulcrum 29 upon which is attached a strap 30 carrying a rod 31, a downwardly directed vertical force is distributed on the sheet 21, along the transverse axis thereof. Said force is produced by means of the weight 32 and the lever 33 to which the rod 31 is connected through the intermediary of the axle 34. The lever 33 is movable about the axle 35.

Figure 6:
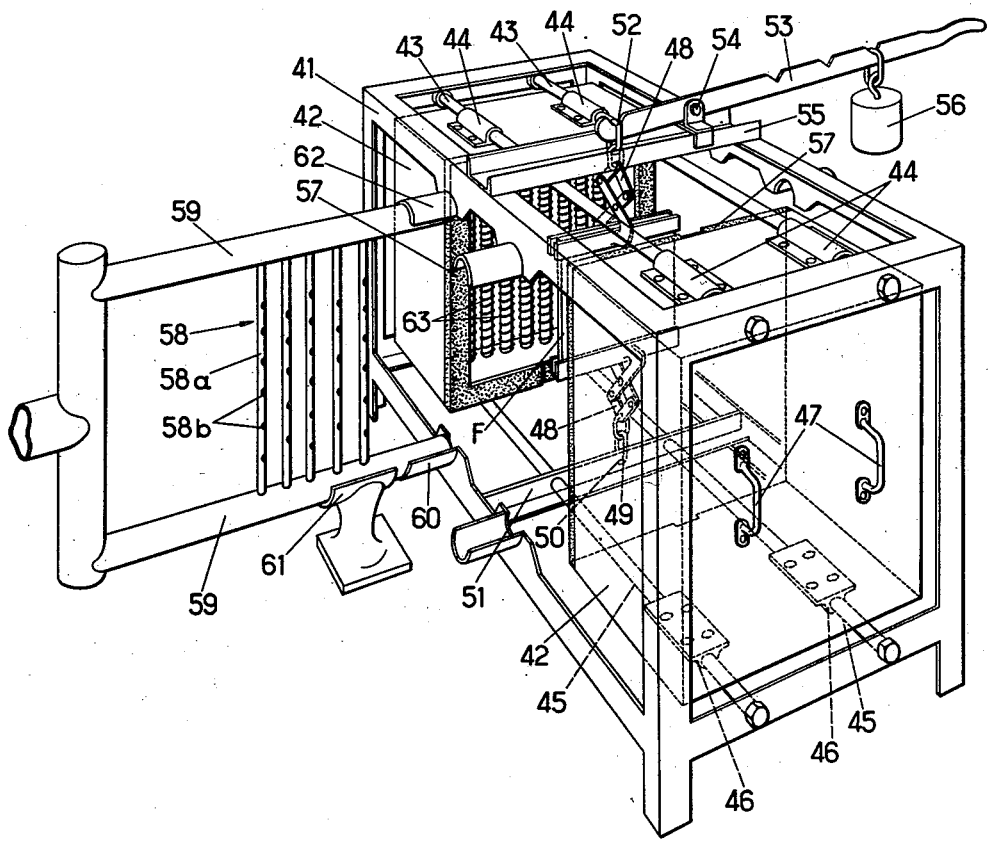
Fig. 6 is a perspective view of still another type of furnace which may be employed to heat and cool the glass sheet, as desired, during the application of force thereto.

Fig. 6 shows a frame 41 inside which two halves of an electric oven 42 may be displaced parallel to the longitudinal axis of the frame 41 by means of upper shafts 43 (over which slide the guiding members 44) and the lower shafts 45 (over which slide the guiding members 46).

Handles 47 are used to separate the two halves of the oven.

The sheet F to be treated is suspended between two tongs 48 carrying supporting rings.

The lower tongs are fastened to the frame by a ring 49 which extends through opening 50 of the T-shaped transverse member 51 which is integral with the frame.

The upper ring 52 of the upper tongs is supported over the hook-shaped end of lever 53 which pivots about axis 54 (on the U-shaped transverse member 55) and which, by means of displaceable weight 56, exerts continuous tension on the upper tongs 48.

The means affording rapid cooling is shown on the left side of Fig. 6. This means includes two blowing nozzles 58 which blow compressed air symmetrically over the surfaces of the glass sheets while the latter is still tensioned and after the heating operation has occurred, see Fig. 3.

In order to render Fig. 6 clearer only one of the blowing nozzles 58 is shown. This nozzle includes a plurality of parallel tubes 58a provided with openings 58b which are welded to supply conduits 59.

The nozzle 58 is shown before it is placed opposite the sheet F. The lower supply conduit 59 is supported on guide members 60, 61 and the upper supply conduit 59 is guided by support member 62 in a vertical plane.

Once the heating is completed the oven sections are separated, the nozzles 58 are placed on opposite sides of the sheet F and air is blown by nozzles 58 onto said sheet.

Figure 7:
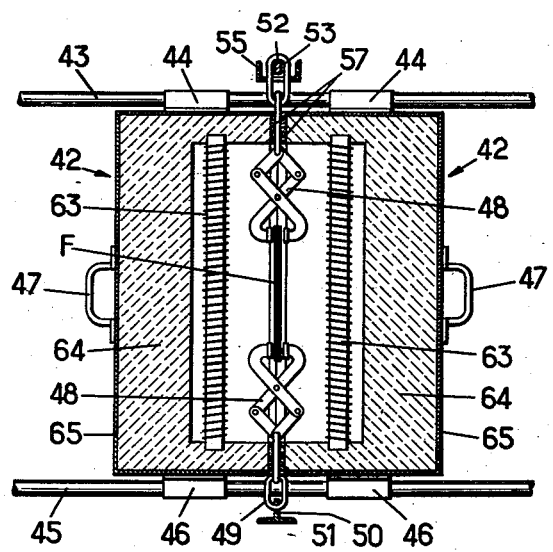
Fig. 7 is a vertical section through the oven or furnace of Fig. 6 when the two separable halves thereof are joined.

In Fig. 7 the sheet F is shown while it is heated between the oven sections 42 each of which includes a plurality of heating bodies 63 made from a member of refractory material which has a helical groove within which the heating resistance is supported.

The walls of each oven section are made from a refractory material 64 made up from one or several pieces and contained within an external envelope 65 of sheet metal.

Figure 8:
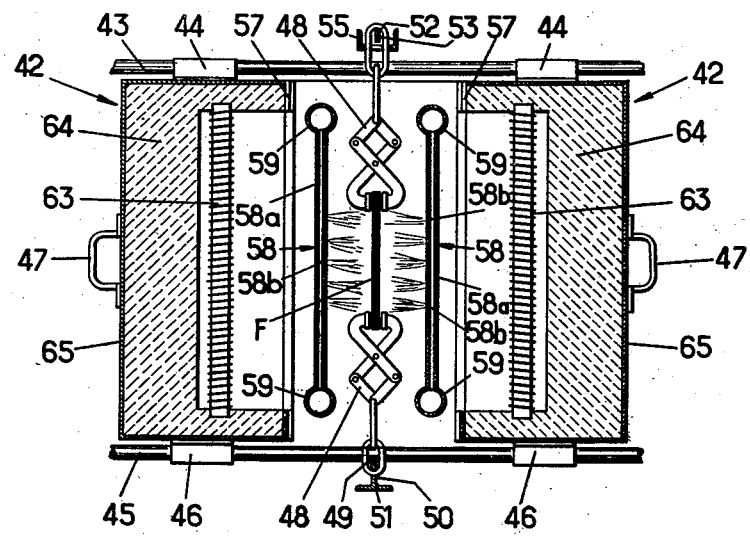
Fig. 8 is a vertical section of the oven of Fig. 6 with the two halves thereof separated, and the blowing nozzles positioned for cooling the glass sheet.

According to Fig. 8 the sheet F is shown when it is rapidly cooled and still tensioned between the blowing nozzles 58. The two oven sections are then in their maximum spread apart position.

The following examples are furnished by way of illustrating the present invention and the manner in which the process may be effected to produce the novel birefringent glasses:

*Example I*

A glass plate about 0.4 cm. thick and analyzing by weight

| | Percent |
|---|---|
| $SiO_2$ | 68 |
| $B_2O_3$ | 22 |
| $Al_2O_3$ | 1 |
| $Na_2O + K_2O$ | 9 | is suspended vertically in the furnace of Fig. 6 and is subjected to a constraint of 6.5 kg./cm.$^2$. The temperature is raised from room temperature at the rate of 150° C./hr. until a temperature of 620° C. is reached, corresponding to a viscosity of the glass of about $10^{11}$ poises. The temperature is maintained for about 35 minutes, the glass undergoing an elongation of about 9%. The heating is then terminated and the glass permitted to cool to a temperature of about 400° C., whereupon the mechanical constraint is terminated and the glass is left in place. Thereafter the glass is annealed by being brought to a temperature of 530° C., maintained there for about 3 hours, and cooled to room temperature at the rate of 150° C./hr.

Using a Babinet compensator and with a radiation having a wave length $\lambda$ of 0.546$\mu$ and produced by a mercury vapor lamp, the following results are obtained for the birefringence: The difference between the courses or paths of the radiation passing through the thickness of the glass is 0.306$\lambda$, i. e., a little more than ¼ wave length. The birefringence of the sheet of glass of .35 cm. thickness determined at a wave length of 0.546$\mu$ is $4.8 \times 10^{-5}$, i. e., it introduces a difference in the paths of radiations passing through the glass of 480 millimicrons (m$\mu$) per centimeter of glass traversed.

The birefringence is determined by the following formula:

$$e\Delta n = k\lambda$$

wherein:
$e$ represents the thickness of the glass,
$\Delta n$ represents the birefringence of the glass, and
$k\lambda$ represents the difference between the paths of the radiations passing through the glass.

*Example II*

A glass plate about 0.4 cm. thick and analyzing by weight

| | Percent |
|---|---|
| $SiO_2$ | 69 |
| $B_2O_3$ | 9 |
| $Al_2O_3$ | 3 |
| $Na_2O + K_2O$ | 4 |
| $CaO + BaO$ | 12 |
| $PbO$ | 2 |
| $ZnO$ | 1 | is suspended vertically as in Example I and subjected to a constraint of 5.0 kg./cm.$^2$ (Sample 1). The temperature is brought from room temperature up to 670° C. at the rate of 150° C./hr. For this particular composition a temperature of 670° C. corresponds to a viscosity of $10^{11}$ poises. After 35 minutes at 670° C. heating is terminated and the glass is cooled to 400° C. After removing the weight annealing is effected in conventional manner as described in Example I at a temperature of 580° C.

The process is repeated with a further glass plate (Sample 2) but subjected to a constraint of 3.5 kg./cm.$^2$ and the following results are obtained:

The difference in the paths of radiations of a wave length of 0.546$\mu$ in passing through the plates are:

Sample 1, thickness 0.36 cm. _____ 0.32$\lambda$
Sample 2, thickness 0.405 cm. _____ 0.18$\lambda$ The birefringence, i. e., the difference in the paths per centimeter of thickness, is as follows:

Sample 1, $\Delta n = 4.9 \times 10^{-5}$ or 490 m$\mu$/cm.
Sample 2, $\Delta n = 2.4 \times 10^{-5}$ or 240 m$\mu$/cm.

It will be noted that in the two cases shown, the birefringence of the sheet of glass is uniform throughout.

*Example III*

A glass rod about 0.4 cm. in diameter and having the composition given in Example II is placed in a horizontal tubular furnace equipped with a temperature control and supported freely therein by spaced clamps. A tension corresponding to 11 kg./cm.$^2$ is placed on the rod and the temperature is raised at the rate of 150° C./hr. until a temperature of 680° C. is reached. The temperature and tension are maintained until an elongation of 22% is achieved at which time the heating is discontinued and the rod permitted to cool to 400° C. During the elongation the clamps are moved away from each other sufficiently to compensate for the elongation, thereby avoiding contact with the furnace wall due to sagging of the rod. The force is removed and the rod annealed as in Example II at a temperature of 580° C. The rod is thereafter permitted to cool in the furnace at the rate of 150° C./hr.

The birefringence of the rod so treated is 5050 m$\mu$ per centimeter of thickness.

The foregoing experiments indicate that the birefringence is a function of the deformation of the sample as well as being a function of the composition of the glass.

The extremely high birefringences are unsuited for practical application as previously noted. Glasses which exhibit birefringence of about 550 millimicrons are particularly suited for the production of polarized light, in lighting applications, and in the production of birefringence compensators. This is true also for one-fourth wave length plates, and one-half wave length plates.

It can thus be seen that there has been provided a process for producing permanently birefringent glass, comprising the steps of heating a glass containing by weight about 50–75% $SiO_2$, 5–25% $B_2O_3$, and less than 5% $Al_2O_3$, to a first temperature at which the viscosity of said glass ranges between $10^{10}$ and $10^{13}$ poises, applying tension to said glass at said first temperature, cooling said glass to a second temperature at which the viscosity of said glass exceeds $10^{13}$ poises, while continuing said tension, and thereafter cooling said glass slowly to room temperature.

Various changes may be made without departing from the spirit and scope of the present invention and it is intended that such obvious changes be embraced by the annexed claims.

Having thus described the invention, what is claimed as new and desired to be secured by Letters Patent, is:

1. The process of producing an annealed glass sheet having permanent birefringent properties which comprises heating a borosilicate glass sheet containing by weight from 50–75% $SiO_2$, 5–25% $B_2O_3$, and less than 5% $Al_2O_3$, to a first temperature at which the viscosity of said glass ranges between $10^{10}$ and $10^{13}$ poises, applying an external mechanical force to said glass sheet at said first temperature, reducing the temperature of said glass sheet to a second temperature at which the viscosity exceeds $10^{13}$ poises while continuing the application of said external force, and thereafter cooling said glass gradually to room temperature in such manner as to inhibit the retention therein of permanent internal stresses resulting from temperature gradients created in the glass during the cooling steps, whereby an annealed glass sheet is obtained exhibiting permanent birefringent properties, said glass being cooled in such manner as to inhibit the retention therein of permanent internal stresses resulting from temperature gradients created in the glass during the cooling steps.

2. The process according to claim 1, wherein said glass is cooled slowly from said first temperature to room temperature.

3. The process according to claim 1, wherein said glass is cooled rapidly from said first temperature to said second temperature, is then annealed by heating it to an elevated temperature at which the viscosity of the glass still exceeds $10^{13}$ poises, and thereafter permitting it to cool gradually to room temperature.

4. The process of producing an annealed glass sheet having permanent birefringent properties; which comprises heating a borosilicate glass sheet containing by weight about 50–75% $SiO_2$, 5–25% $B_2O_3$, and less than 5% $Al_2O_3$, to a first temperature at which the viscosity of said glass ranges between $10^{10}$ and $10^{13}$ poises, applying tension to said glass at said first temperature, cooling said glass to a second temperature at which the viscosity of said glass exceeds $10^{13}$ poises while continuing said tension, and thereafter annealing said glass by cooling it to room temperature in such manner as to inhibit the retention therein of permanent internal stresses resulting from temperature gradients created in the glass during the cooling steps; whereby permanent birefringent properties which are uniform in sign are imparted to said glass, said glass being cooled in such manner as to inhibit the retention therein of permanent internal stresses resulting from temperature gradients created in the glass during the cooling steps.

5. The process according to claim 4, wherein said glass further contains the oxide of at least one alkaline earth metal.

6. The process according to claim 4, wherein the glass is cooled slowly from said first temperature to said second temperature and then to room temperature, the tension being discontinued after reaching said second temperature.

7. The process according to claim 4, wherein said glass is cooled rapidly from said first temperature to said second temperature, the tension is discontinued, said glass is annealed by reheating it to an elevated temperature at which the viscosity of the glass still exceeds $10^{13}$ poises and thereafter permitting it to cool slowly to room temperature.

8. The process of producing an annealed glass sheet having permanent birefringent properties which comprises heating a borosilicate glass sheet having the following approximate weight composition

| | Percent |
|---|---|
| $SiO_2$ | 68 |
| $B_2O_3$ | 22 |
| Other metal oxides | 10 | no more than half of said other metal oxides comprising aluminum oxide, to a first temperature of about 620° C., applying tension to said glass at said first temperature, cooling said glass to a second temperature at which the viscosity of said glass exceeds $10^{13}$ poises while continuing said tension, and thereafter cooling said glass slowly to room temperature, whereby permanent birefringent properties are imparted to said glass, said glass being cooled in such manner as to inhibit the retention therein of permanent internal stresses resulting from temperature gradients created in the glass during the cooling steps.

9. The process of producing an annealed glass sheet having permanent birefringent properties which comprises heating a borosilicate glass sheet having the following approximate weight composition

| | Percent |
|---|---|
| $SiO_2$ | 69 |
| $B_2O_3$ | 9 |
| Alkaline earth metal oxides | 12 |
| Other metal oxides | 10 | no more than half of said other metal oxides comprising aluminum oxide, to a first temperature of about 670° C., applying tension to said glass at said first temperature, cooling said glass to a second temperature at which the viscosity of said glass exceeds $10^{13}$ poises while continuing said tension, and thereafter cooling said glass slowly to room temperature, whereby permanent birefringent properties are imparted to said glass, said glass being cooled in such manner as to inhibit the retention therein of permanent internal stresses resulting from temperature gradients created in the glass during the cooling steps.

References Cited in the file of this patent

UNITED STATES PATENTS

| 2,148,630 | Lillie et al. | Feb. 28, 1929 |
| 2,237,343 | Engels | Apr. 8, 1941 |
| 2,252,703 | De Tailly | Aug. 19, 1941 |
| 2,269,597 | Mitford | Jan. 13, 1942 |
| 2,367,111 | Fowler | Jan. 9, 1945 |
| 2,433,883 | Armistead | Jan. 6, 1948 |
| 2,657,146 | Kreidl | Oct. 27, 1953 |

FOREIGN PATENTS

| 614,682 | France | Sept. 21, 1926 |

U. S. DEPARTMENT OF COMMERCE
PATENT OFFICE

CERTIFICATE OF CORRECTION

Patent No. 2,823,491     Bernard Long     February 18, 1958

It is hereby certified that error appears in the printed specification of the above numbered patent requiring correction and that the said Letters Patent should read as corrected below.

Column 7, lines 8 to 11, and lines 36 to 39, beginning with ", said glass being", each occurrence, strike out all to and including "cooling steps".

Signed and sealed this 24th day of June 1958.

(SEAL)
Attest:
KARL H. AXLINE

Attesting Officer

ROBERT C. WATSON
Commissioner of Patents